US011455406B2

(12) United States Patent
Nicolas et al.

(10) Patent No.: US 11,455,406 B2
(45) Date of Patent: *Sep. 27, 2022

(54) DELEGATED PRIVATE SET INTERSECTION, AND APPLICATIONS THEREOF

(71) Applicant: QED-it Systems Ltd., Tel Aviv-Jaffa (IL)

(72) Inventors: Aurélien Renaud François Nicolas, Berlin (DE); Daniel Messod Benarroch Guenun, Tel Aviv (IL); Arbel Deutsch Peled, Tel Aviv (IL); Ori Wallenstein, Raanana (IL)

(73) Assignee: QED-it Systems Ltd., Tel Aviv-Jaffa (IL)

(*) Notice: Subject to any disclaimer, the term of this patent is extended or adjusted under 35 U.S.C. 154(b) by 100 days.

This patent is subject to a terminal disclaimer.

(21) Appl. No.: 17/121,282

(22) Filed: Dec. 14, 2020

(65) Prior Publication Data
US 2021/0240841 A1 Aug. 5, 2021

Related U.S. Application Data

(63) Continuation of application No. 16/780,671, filed on Feb. 3, 2020, now Pat. No. 10,878,108.

(51) Int. Cl.
| G06F 21/60 | (2013.01) |
| H04L 9/06 | (2006.01) |
| H04L 9/40 | (2022.01) |
| H04L 9/32 | (2006.01) |
| H04L 9/00 | (2022.01) |

(52) U.S. Cl.
CPC ............ G06F 21/602 (2013.01); H04L 9/008 (2013.01); H04L 9/0643 (2013.01); H04L 9/3221 (2013.01); H04L 63/0281 (2013.01); H04L 63/0464 (2013.01); H04L 9/50 (2022.05)

(58) Field of Classification Search
CPC ..... G06F 21/602; H04L 9/008; H04L 9/0643; H04L 9/3221; H04L 63/0281; H04L 63/0464; H04L 9/50
See application file for complete search history.

(56) References Cited

U.S. PATENT DOCUMENTS

| 6,834,272 B1* | 12/2004 | Naor | G06Q 20/0855 |
| | | | 705/37 |
| 2003/0084003 A1* | 5/2003 | Pinkas | G06Q 20/3829 |
| | | | 705/71 |
| 2005/0169480 A1* | 8/2005 | Kuehn | H04L 63/06 |
| | | | 380/277 |

(Continued)

*Primary Examiner* — Ayoub Alata
(74) *Attorney, Agent, or Firm* — Sterne, Kessler, Goldstein & Fox P.L.L.C.

(57) ABSTRACT

Embodiments disclosed herein describe computing private set intersection (PSI) between various parties using delegation to other devices and in one round of interaction (request and response). The various parties involved and their associated computing devices are referred to herein as participants. The protocol is forward-secure and completely hides the data of participants from an eavesdropper. Because the protocol only uses a single round of interaction, it is more efficient and does not require each participant to have servers that remain online continuously.

23 Claims, 7 Drawing Sheets (56) References Cited

U.S. PATENT DOCUMENTS

| | | | |
|---|---|---|---|
| 2013/0031371 A1* | 1/2013 | McLellan | G06F 21/575 |
| | | | 713/182 |
| 2016/0004864 A1* | 1/2016 | Falk | G06F 21/56 |
| | | | 726/23 |
| 2019/0318346 A1* | 10/2019 | Ben-David | H04L 9/30 |
| 2020/0314075 A1* | 10/2020 | Barajas Gonzalez | |
| | | | G06F 21/6218 |

* cited by examiner

DELEGATED PRIVATE SET INTERSECTION, AND APPLICATIONS THEREOF

BACKGROUND

Field

The present disclosure relates generally to identifying common elements between at least two data sets.

Related Art

Many situations exist where companies or individuals want to compare data sets with another party to determine whether the data sets have any records in common without sharing their underlying data with the other party. For example, sometimes companies may want to compare customer lists to determine whether a strategic partnership would be advantageous. Each company would like to keep the customer lists as a trade secret. However, the companies would like to determine which customers they have in common. In another example, insurance companies sometimes need to cross-reference claims to determine whether a claimant has filed duplicate claims with multiple companies. Again, insurance companies would like to keep the claims data confidential, and would like to avoid sharing information with possible competitors. But, at the same time, they would like to know whether there is overlap between the claims data that could be fraudulent.

To deal with this, sometimes companies provide their confidential information to third parties, such as accounting firms like Deloitte or EY. These third parties can view the data and disclose any data in common to the various companies without revealing any confidential information to the other. However, this can be expensive.

In addition, sometimes companies sometimes use joint ventures for this reason. In this example, both companies disclose their confidential information to the joint venture. But, since the joint venture is independent of both companies, the disclosed information would not be revealed to the other party, but the joint venture can determine which data records overlap between the parties.

Software programming techniques are available for determining which data records overlap without disclosing the underlying data. For example, both parties may apply a cryptographic hash to their data records and compare the resulting hash values. A hash function is any function that can be used to map data of arbitrary size to fixed-size values. A cryptographic hash is hash function that is one-way, that is, a function which is practically infeasible to invert, or infeasible to invert without a private key. Examples of cryptographic hash functions include SHA-256, SHA-3, Blake2 family, MiMC.

However, hash functions, even cryptographic hash functions can be vulnerable to a brute force attack. For example, for things like customer lists, there may be only a few million possibilities. By simply trying out all of the possibilities, eventually, a customer corresponding to a hash can be identified.

To deal with this, a hash algorithm may use a cryptographic keys to add entropy to the data sets being hashed. For example, a salt value may be added or a key may be added to what is hashed. Because the salt value or key adds many more possibilities, this technique may make brute force attacks difficult or impossible. However, the key value still needs to be managed, and there is a risk that the key will be stolen.

Various algorithms are available that deal with these issues. For example, techniques are described in: (i) Kolesnikov et al., "Efficient Batched Oblivious PRF with Applications to Private Set Intersection," 23rd ACM Conference on Computer and Communications Security, October 2016; (ii) Pinkas et al., "Efficient Circuit-based PSI with Linear Communication," *Eurocrypt,* 2019; (iii) Falk et al., "Private Set Intersection with Linear Communication from General Assumptions," *Workshop on Privacy in the Electronic Society,* November 2019.

However, many or all of the available algorithms require multiple interactions between the various participants. These multiple interactions can reduce computational efficiency. Moreover, they may require each party to have a dedicated server online to execute a portion of the interaction. Again, this adds cost and burden.

In this manner, new systems and methods are needed for private set intersection that are computationally efficient and secure.

BRIEF SUMMARY

Embodiments improve security and efficiency by delegating determination of a keyed hash to a chain of delegate modules such that each applies a portion of a key. In an embodiment, a method determines an intersection between two private data sets. In the method, a first value is received from a first participant. The first value represents a first record from a first private data set. A first keyed hash value of the first value is calculated using a chain of delegate modules. In different embodiments, the chain of delegate modules communicate with one another, or each delegate module can send the intermediate values back to the participant, which sends it onto the next delegate module. To calculate the keyed hash value, a partial key is applied to determine a next intermediate value. Partial keys are repeatedly applied for respective delegate modules and passed to the next delegate module in the chain of delegate modules. The partial keys are private to the respective delegate modules. The virtual private key used to generate the first keyed hash value is a combination of the partial key of each of the respective delegate modules. The process is repeated for another value received from the second participant to determine a second keyed hash value. The first and second participants use the first and second keyed hash values to determine inputs that are compared to identify a match.

In some embodiments, a non-transitory computer-readable device is disclosed, the non-transitory computer-readable device may have instructions stored thereon that, when executed by at least one computing device, may cause the at least one computing device to perform the computer-implemented method described above.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Embodiments disclosed herein describe computing private set intersection (PSI) between various parties using delegation to other devices and in one round of interaction (request and response). The various parties involved and their associated computing devices are referred to herein as participants. The protocol is forward-secure and completely hides the data of participants from an eavesdropper. Because the protocol only uses a single round of interaction, it is more efficient and does not require each participant to have servers that remain online continuously.

Figure 1:
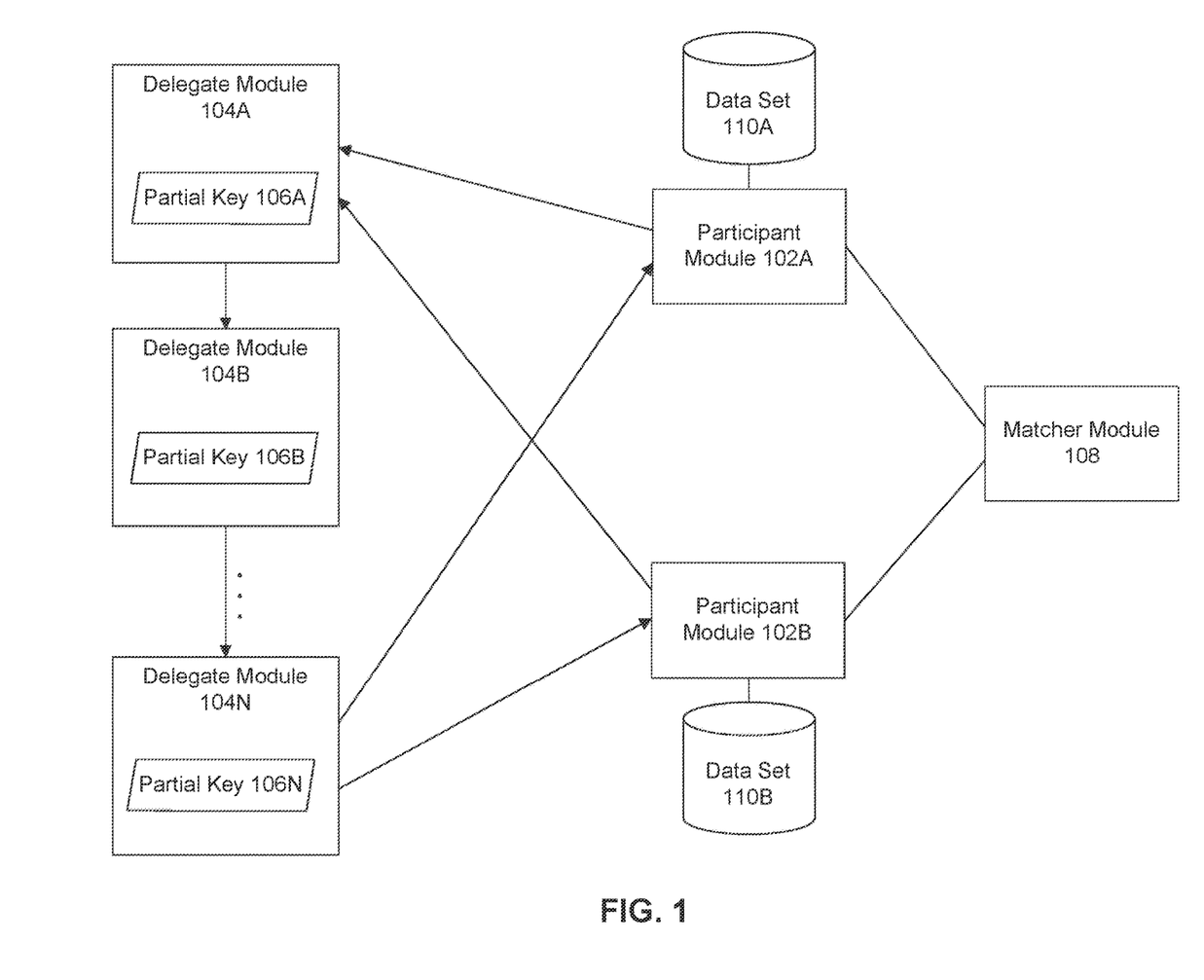
FIG. 1 depicts a system that uses delegate modules to securely and efficiently determine which portion of two data sets intersect, according to an embodiment.

FIG. 1 depicts a system 100 that uses delegate modules to securely and efficiently determine which portion of two data sets intersect, according to an embodiment. System 100 includes participant modules 102A-B, matcher module 108 and delegate modules 104A . . . N. Each of these components are described in turn and operation of system 100 is described below respect to FIG. 2.

Participant module 102A-B are each modules corresponding to a party with private data that needs to be cross-referenced with that of other parties. For example, participant modules 102A and B may correspond to participants that like to determine which data they have in common, without sharing their respective data. Private data is stored in respective data sets 110A-B. Parties are responsible only for their own data and security. In other words, data set 110A is private to participant module 102A, and data set 110B is private to participant module 102B. While two participants are shown for simplicity, a skilled artisan would recognize that any number participants can be present.

As mentioned above, data set 110A-B is secret and private to respective participants 104A-B. As described above, examples could be customer lists or insurance claims data. Each data set 110A-B may include records, and each record may be identified with an identifier. While the record may be secret, the identifier may not be. As will be described in greater detail below expect FIG. 2, participant modules 102A-B may send possibly randomized versions of their data records to delegate modules 104A-N to determine keyed hash values.

Delegate modules 104A-N each have a partial key 106A-N. The collective partial keys 106A-N make up a virtual key used to make the keyed hash value. Each delegate module 104A-N is responsible for safeguarding its own respective partial key 106A-N. However, because no single delegate module 104A-N has the entire virtual key, if any one of them is compromised, an attacker would be unable to steal the entire key and to decipher private data of a participant. This reduces the risk of a data breach.

The number of delegate modules 104A-N may be configurable, such that a larger number of delegate modules 104A-N may reduce risk of a data breach, because reconstructing the virtual key would require an attacker to breach all of them.

A set up process may be needed to initiate private keys 106A-N in the respective delegate modules 104A-N. In other words, before system 100 can function properly, delegate modules 104A-N need to determine a secret key k for the system. However, none of them (indeed, no one whatsoever) should know this key. Delegate modules 104A-N determine private keys 106A-N and hence secret key k by performing a sample a field element, and that would be their own share of the key.

Once delegate modules 104A-N are set up, they can receive data from participant modules 102A and B and compute corresponding keyed hash values. To compute the keyed hash values, delegate modules 104A-N form a chain and each applies its corresponding partial key 106A-N. This may be done in order. Alternatively, if the function to apply the corresponding partial key 106A-N is commutative, this can be done in any order arbitrarily. Once all delegate modules 104A-N have applied their corresponding partial key 106A-N, the resulting key hashed value is returned to the participant module 102A-B from which the data record originated.

As mentioned above, the participants may randomize their records before sending them to chain of delegate modules 104A-N. For example, sampling a random number and exponentiation values generated based on their records with the random number. When a resulting keyed hash value is returned from delegate modules 104A-N, the keyed hash value is de-randomized. In example, the keyed hash value may be exponentiating by an inverse of the random number. In this way, the records are kept secret from delegate modules 104A-N. In another embodiment, the various delegate modules 104A-N and matcher module 108 may incrementally de-randomize the number as described below with respect to FIG. 6. In addition, because the keyed hash value was generated by separate delegate modules 104A-N, participant modules 102A-B are not exposed to nor required to persist volatile cryptographic keys.

Matcher module 108 performs the set intersection. Matcher module 108 is centralized and need not be trusted because it only receives the de-randomized keyed hash values from participant modules 102A and 102B. The values received at matcher module 108 are already hashed in a way that makes a brute force attack impossible. For that reason, matcher module 108 need not be trusted by either party.

Once both participant modules 102A and 102B provide their de-randomized keyed hash values, matcher module 108 compares all the various values and returns IDs corresponding the records that match to both participant modules 102A and 102B. This is possible because the keyed hash values are keyed using the same key, and given the deterministic nature of cryptographic hash functions, two data values will yield the same keyed hash value. In this way, matcher module 108 conducts private set intersection. If participant module 102A provides matcher module 108 its values before participant module 102B, participant modules 102A needs only wait for participant module 102B to provide its keyed hash values before receiving the intersection data from matcher module 108. In this way, private set intersection is accomplished in a single request-response interaction.

Figure 2:
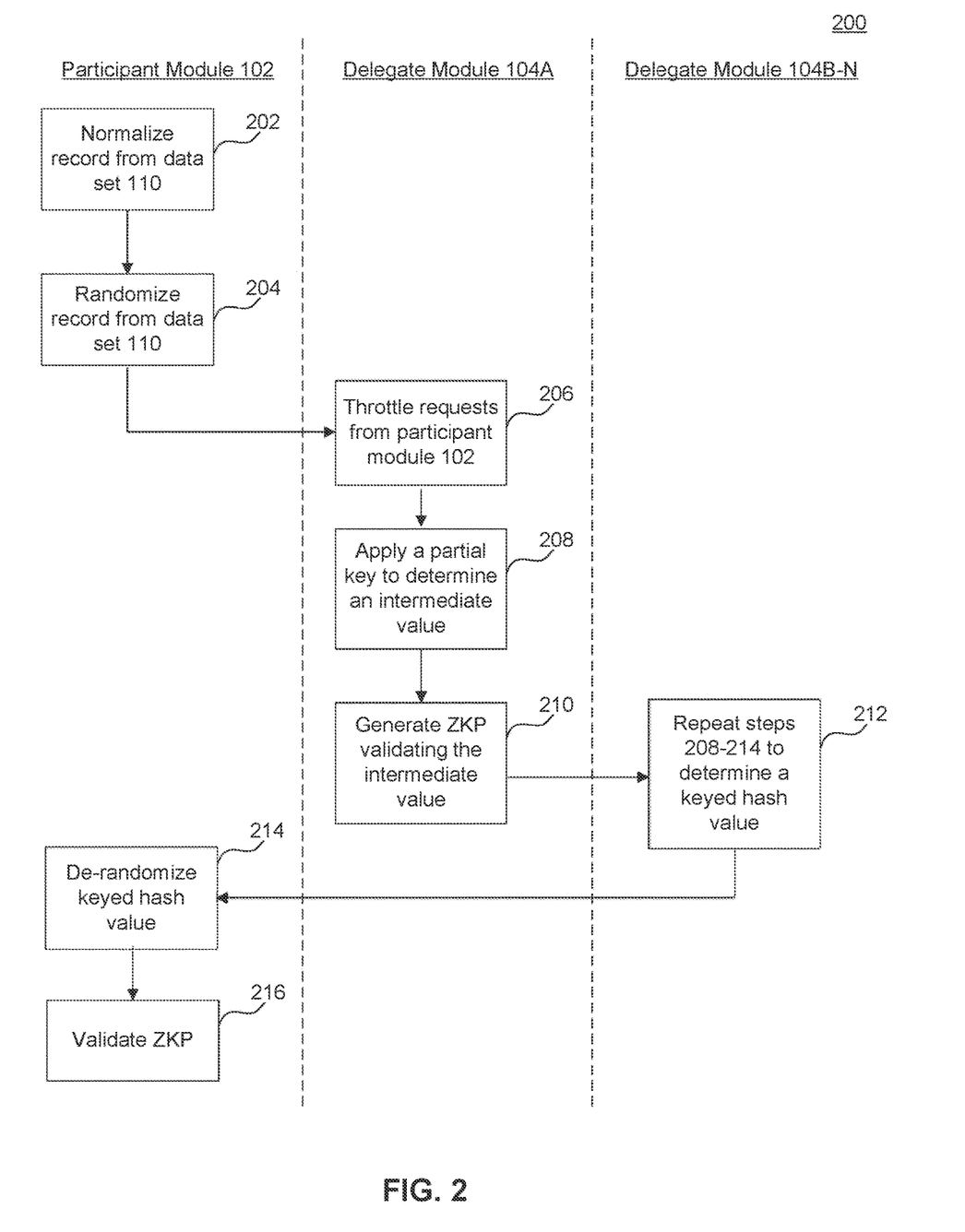
FIG. 2 depicts a method for determining a keyed hash value that may be used in operation of the system of FIG. 1, according to an embodiment.

FIG. 2 depicts a method 200 for determining a keyed hash value that may be used in operation of the system of FIG. 1, according to an embodiment.

Method 200 begins at step 202 when participant module 102 normalizes its data records and its corresponding data set 110. Each participant may represent data in a somewhat different format. Normalization is the process of transforming the input data into a common form. This normalization process may be coordinated between the different participants, who must all follow the same format. Without this step, the resulting hash values may end up not matching, even if the underlying data is the same. For example, the date Oct. 1, 2019 can be written as 10/1/19, 10/01/2019, 01/10/19, Oct. 1, 2019. Although 10/1/19 and 10/01/2019 refer to the same date the resulting hashes of these inputs will be completely different and could not be matched by the matcher. Thus a normalization process can turn both dates to a common format of DD/MM/YYYY. Now both dates will yield the same hash which will allow the Matcher to identify the match.

The normalization may be according to the type of data that exists within the particular column in the data set and the amount of variance in its formatting. For example, names can be normalized by removing diacritics and whitespace. Addresses can be translated to geographic lat/long coordinates, keeping just the beginning significant digits of each coordinate to account for variations in the geocoding. Country names can be translated into country codes. Dates and timestamps can be transformed to any standard format.

As mentioned above, a record may have been an associated identifier id and a private data record $x_{id}$. Normalization may be described by the equation $x_{id}$: $n_{id}=N(x_{id})$.

At step 204, participant module 102 randomizes the normalized value generated from a record in the data set. To randomize values, participant module 102 samples a new, different random element $r_x \leftarrow F_q$ for each data entry x. The random number may be a blinding factor.

After sampling the random number, a one-way cryptographic combination is made combining the random number and the normalized value. In an embodiment, the cryptographic combination may be homomorphic. In examples, the cryptographic combination may involve computing a hash-to-group for the entry x, $g_x=Hash_G(x)$. Alternatively or additionally, the cryptographic validation may involve exponentiation the normalized value with an inverse of the random number. In this way, step 204 conceals the underlying value from the delegate module.

Participant 102 sends the randomized, normalized value to delegate module 104A and, at step 206, a delegate module 104A may throttle requests from participant module 102. By throttling requests, delegate module 104A checks to see whether the number of requests from participant module 102 during a particular timeframe exceeds a threshold. If it does, delegate module 104A may deny the request. The threshold may be set according to an expected size of the data set sought to be compared. If the number of requests received is an order of magnitude different from the expected size of the data, participant module 102 may be submitting fraudulent requests and attempting to execute a brute force attack and effort to discern a competitor's data. This throttling process serves that participant module 102 will not be able execute a brute force attack and effort to identify competitors data. The ZKPs to be generated and verified in steps 210 and 216 ensure that the request allocation is not being hijacked by a nefarious party.

At step 208, delegate module 104A applies a partial key to determine an intermediate value. This may involve a one-way cryptographic operation, such as applying a collision resistant hash function. That intermediate value is passed on between delegate machines 104A-N, as each applies its respective partial key. This can also be achieved by sending the intermediate value back to the participant who will send it the next delegate, as illustrated with respect to FIG. 4 described in greater detail below. Also it is possible to do this with a router, or proxy, machine that will get the randomized input from the participant, send it to the delegate for hashing with the virtual private key and then send it back to the participant, as illustrated with respect to FIG. 5 described in greater detail below. To apply the partial key, an exponentiation function may be applied. For example, if $g_0$ is the previous intermediate value, $g_1$ is the next intermediate value, and $k_1$ is the partial key, the next intermediate value may be determined by the equation $g_1=g_0^{k1}$.

At step 210, delegate module 104 may determine a zero knowledge proof (ZKP) showing that the next intermediate value was correctly calculated in step 208.

For example, the zero knowledge proof may be generated using the zk-SNARKs, where the exponentiation function is described in the constraint system, the private key is the proving key pk, and the prior intermediate value is the verification key vk.

One example of a ZKP is the zero-knowledge succinct non-interactive argument of knowledge ("zk-SNARK"). The zk-SNARK scheme may use several algorithms including a set-up phase or key generation phase; a proving algorithm; and a verification algorithm. The set-up phase may generate a random string to generate a key and then subsequently destroy the string for security. The proving algorithm generates a proof that is relatively small in size. The size of the generated proof may be independent of the runtime of the program which results in the "succinct" naming convention. The verification algorithm may verify the proof relatively quickly in a time dependent on the size of the input and independent of the length of the computation.

The zk-SNARK cryptography may be described in the following three algorithms:
(1) (pk, vk)=SETUP(CS)
(2) (π)=PROVE(pk, public_data, private_data)
(3) (verified)=VERIFY(vk, π, public_data)

In these algorithms, "CS" represents a constraint system defining a non-probabilistic or nondeterministic polynomial statement. The constraint system may include the function sought to be proved. In this case, constraint system may involve the randomization function applied at step 204. Public_data may be the result of the function and private_data may be the underlying data that should remain confidential. In this example, the CS may specify that the $k_1$ used in the exponentiation of $g_1$ from $g_0$ is the same one as the random field element generated in the setup. The CS may also check that $k_1$ is the same $k_1$ that was generated during setup and/or that, when combined with the other $k_n$s, it yields the cryptographic key K for the keyed hash value. Additionally or alternatively, the CS may prove that that the proof from the previous delegate verifies correctly, fixing the number of proofs that need to be verified by the participant module 102 to one. The SETUP algorithm uses the constraint system to generate a proving key ("pk") and a verification key ("vk") based on the constraint system.

The PROVE algorithm generates a proof from the proving data, the public_data, and the private data. In this example, public_data may be $g_1$ and $g_0$ and private_data may be $k_1$. The symbol π may represent the proof itself generated using the proving key as well as public data and private data. In some implementations, the proof π may be only 300 bytes long. zk-SNARK may have the benefit of proving a succinct proof, regardless of the complexity of the underlying function. Such a proof may be generated at step 210.

The VERIFY algorithm uses the vk and the proof, π, to verify the correctness of the public data. The VERIFY algorithm may return a binary one or zero value indicating whether or not the public data is correct.

Figure 4:
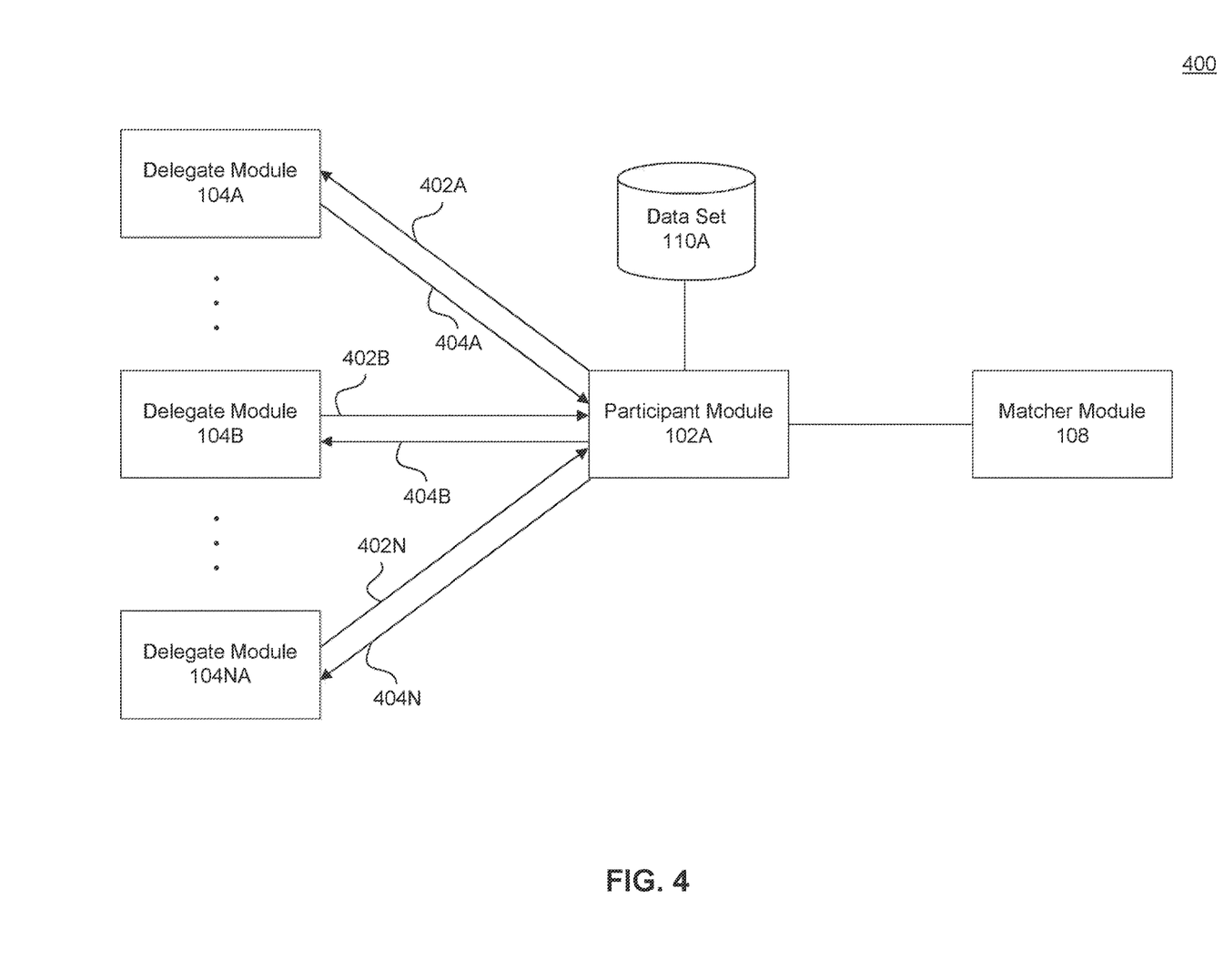
FIG. 4 depicts a system where a participant interacts with each delegate module individually.
Figure 5:
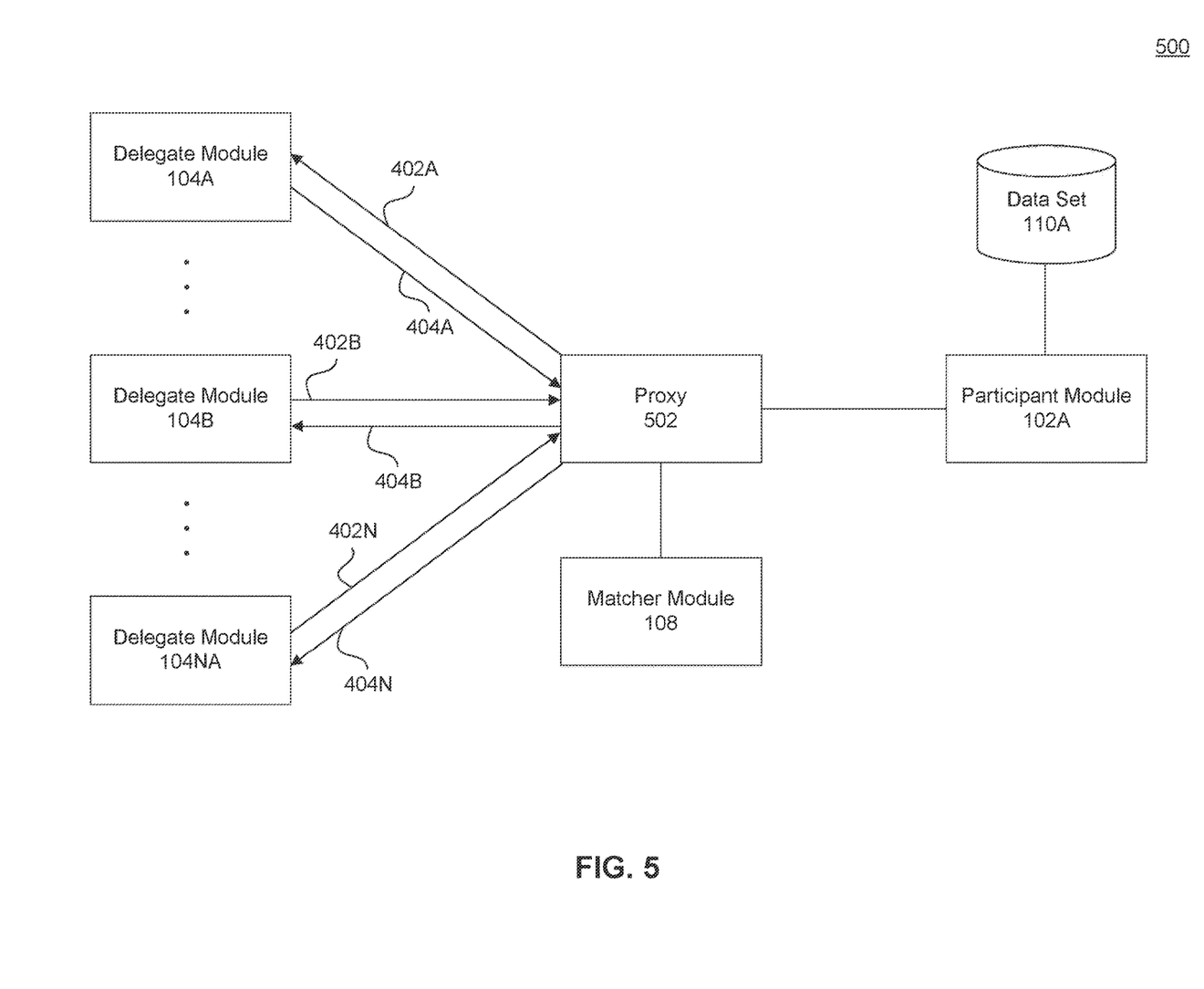
FIG. 5 depicts a system where a proxy server interacts with each delegate module and the matcher.

After generating zero knowledge proof and the intermediate value $g_1$, both are send onto another delegate module, either directly or via participant module 102 or a different proxy as described with respect to FIGS. 4 and 5. Delegate module 104A receives the data, and method 200 continues to step 212.

After generating the next intermediate value and possibly a zero knowledge proof to validate the next intermediate value, at step 212, delegate module 104A transmits them to the next delegate module 104B in the chain of delegate module 104A . . . N. The next delegate module 104B will apply its own private key in a similar manner. It may also verify the zero knowledge proof generated by the previous delegate module 104A and generate its own zero knowledge proof validating its exponentiation function. In this way, the steps 206-210 may be repeated for each delegate module 104 in the chain of delegate modules 104A-N. Thus, a keyed hash value may be determined by the chain of delegate modules 104A-N. The final delegate module 104N returns the keyed hash value, that is, the value with all the partial private keys applied to participant module 102.

At step 214, participant module 102 de-randomizes the keyed hash value received from delegate module 104N. Participant module 102 applies to the keyed hash value an inverse of the one-way cryptographic combination applied at step 204 to remove the first random number from the first input. This will involve recall of the random number sampled in step 204. For example, if the cryptographic function applied at step 204 is an exponentiation of an inverse of a random number with the normalized record, at step 214, participant module 102 exponentiates the keyed hash value received from delegate module 104N by the sampled random number.

In this way, method 200 determines a keyed hash value that represents a record from a participant's dataset.

Figure 3:
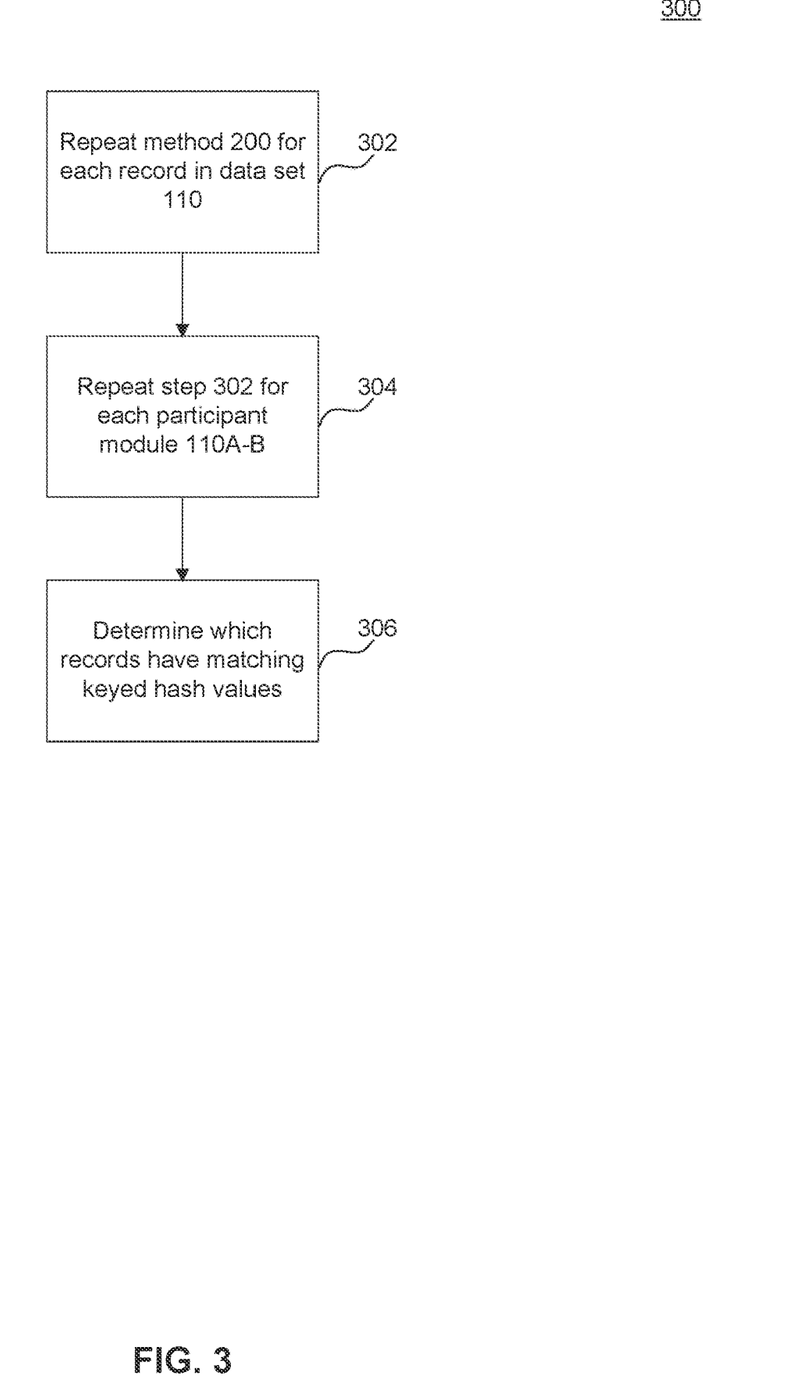
FIG. 3 depicts a method for comparing two data sets that may be used in operation of the system of FIG. 1, according to an embodiment.

FIG. 3 depicts a method 300 for comparing two data sets that may be used in operation of the system of FIG. 1, according to an embodiment. At step 302, method 200 from FIG. 2 is repeated for each data record. In this way, a participant module 102 generates a keyed hash value for each data record.

At step 304, method 300 repeats step 302 for each participant. In this way, each participant receives a keyed hash value for each data record in its data set. These keyed hash values are input into the matcher module, along with corresponding identifiers to track the values.

At step 306, the matcher determines which records have matching keyed hash values. The matcher receives at least two sets of input values, one for a first participant module and one for a second. The matcher may compare each input value in the set of input values to every input value from the second participant. A skilled artisan would recognize that sorting and other techniques may be used to obviate the need to compare every data element. Once matching input values are identified, their corresponding identifiers are sent to the participant module from which they originated.

Figure 6:
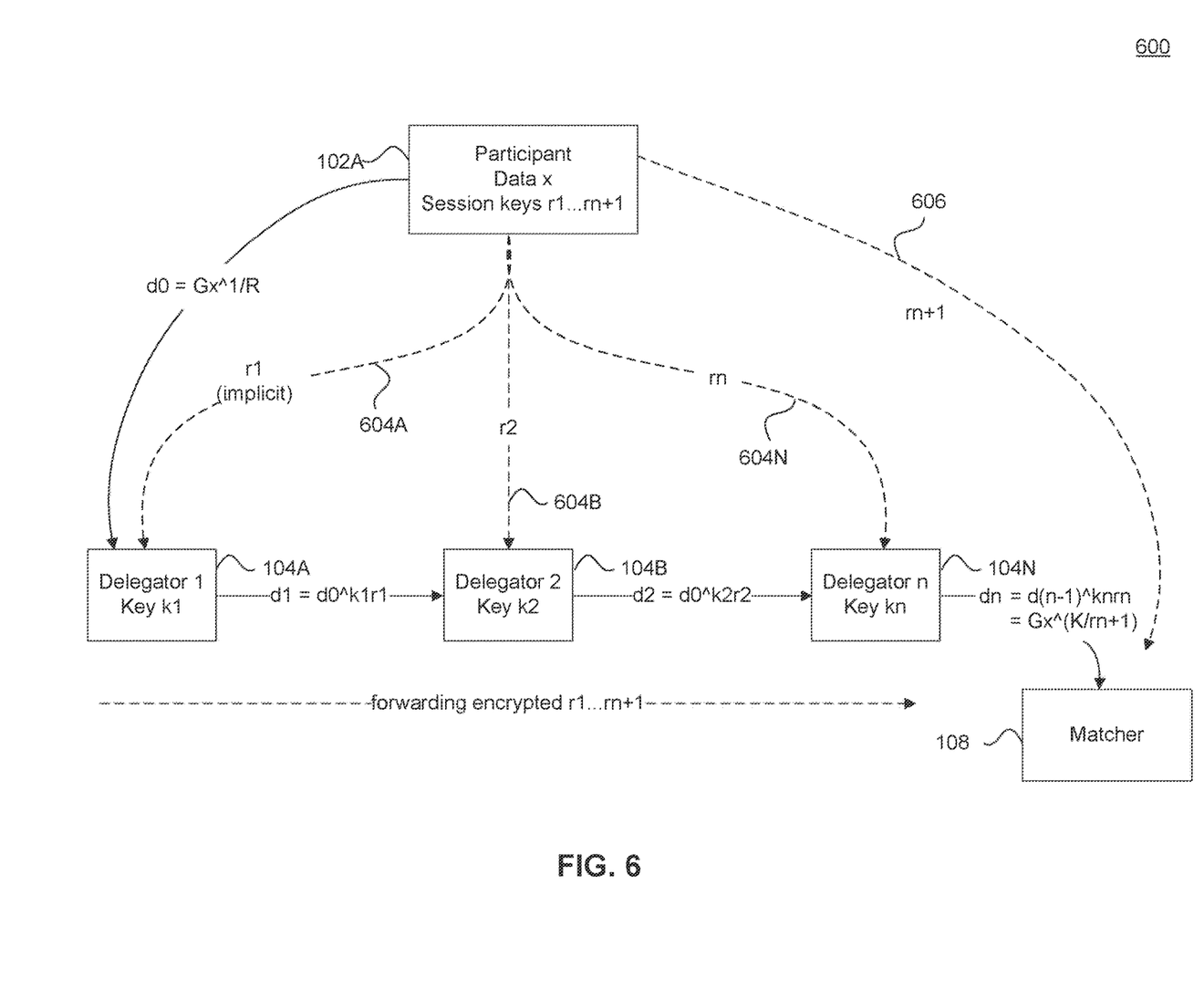
FIG. 6 depicts a system where, after a participant randomizes a record, various delegate modules incrementally de-randomize it.

FIG. 4 depicts a system 400 where a participant interacts with each delegate module individually. System 400 operates similarly to the system and methods described in FIGS. 1-3. However, instead of having delegate modules 104A-N send the intermediate value it determined to the next delegate module, delegate modules 104A-N each return the intermediate value to participant module 102A, and participant module 102A sends the intermediate value onto the next delegate module in the chain of delegate modules. While only one participant module 102A is shown in FIGS. 4-6 for simplicity, the processes described would be repeated for each participant in the private set intersection.

In the embodiment in system 400, participant module 102A sends its randomized record to delegate module 104A at 402A. Then, delegate module 104A determines an intermediate value using its partial key. As described above, delegate module 104A may also determine a zero knowledge proof. Delegate module 104A may send both back to participant module 102A at 404A. Participant module 102A sends the intermediate value to the next delegate module 104B, which repeats the process at 402B and 404B. The process continues for each delegate module in the chain of delegate modules to determine a keyed hash value for comparison.

FIG. 5 depicts a system 500 where a proxy server 502 interacts with each delegate module and matcher module 108. System 500 operates similarly to the system and methods described in FIG. 4. However, in this embodiment, proxy server 502 acts as an intermediary between participant module 102A and delegate modules 104A-N, and perhaps matcher module 108.

In this embodiment, participant module 102A sends a randomized record to proxy server 502. As described above with respect to participant module 102A in FIG. 4, proxy server 502 sends its randomized record to delegate module 104A at 402A. Then, delegate module 104A determines an intermediate value using its partial key. As described above, delegate module 104A may also determine a zero knowledge proof. Delegate module 104A may send both back to proxy module 502 at 404A. Proxy module 502 can validate the proof or alternatively send the proof to participant module 102A for validation. Proxy module 502 sends the intermediate value to the next delegate module 104B, which repeats the process at 402B and 404B. The process continues for each delegate module in the chain of delegate modules to determine a keyed hash value for comparison. When the keyed hashed value is determined, proxy 502 sends it to matcher module 108 for comparison.

FIG. 6 depicts a system 600 where, after a participant randomizes a record, various delegate modules incrementally de-randomize it. In this embodiment, participant module 102A samples n+1 random numbers where n is the number of delegate modules. In other words, participant module 102A samples a random number $r_1 \ldots r_n$ for each of the delegate modules 104A-N and a random number $r_{n+1}$ for matcher module 108. Participant module 102A transmits each of the sampled random numbers to the respective delegate modules 104A-N and matcher module 108. Alternatively or additionally, participant module 102A may send the $r_1$ through $r_{n+1}$ random numbers encrypted such that only delegate 104A can decrypt and read only $r_1$, participant module 104B can decrypt and read only $r_2$, and so on, and matcher 108 can decrypt and read only $r_{n+1}$ These sampled random numbers may be different for each record in the data set participant module 102A wishes to compare.

Participant module 102A determines the product R of the random numbers as illustrated at 602, and that product R is the number used to randomize its record as illustrated at 608. To randomize each respective record, a randomized number is determined by exponentiating the record (or a hash of the record) by the inverse of the product R, $d_0 = G_x^{1/R}$, where $G_x$ is a hash of the private record data, R is the product of the random numbers, and $d_0$ is the randomized value. The randomized value do is transmitted to the first delegate module 104A.

As described above with respect to FIGS. 1-5, the delegate modules 104A-N each apply their private key $k_1$-$k_n$, either by transmitting intermediate values directly between delegate modules 104A-N or by transmitting intermediate values back to participant 102A or to a proxy server as illustrated in FIG. 5. In addition, each delegate modules 104A-N applies respective random number $r_1 \ldots r_n$ received from participant 102A. In both cases, delegate modules 104A-N can apply the private key and random number through exponentiation. In other words, delegate modules 104A determines intermediate value $d_1$ as $d_1 = d_0^{k_1 r_1}$, delegate modules 104B determines intermediate value $d_2$ as $d_2 = d_1^{k_2 r_2}$, and so on for each of the delegate modules 104A-N.

Finally, the keyed hash value $d_n$ is transmitted to matcher module 108. Matcher module 108 exponentiates the keyed hash value $d_n$ by its random number that it received from participant module 102A, $r_{n+1}$. In this way, the value that matcher module 108 compares is de-randomized.

Figure 7:
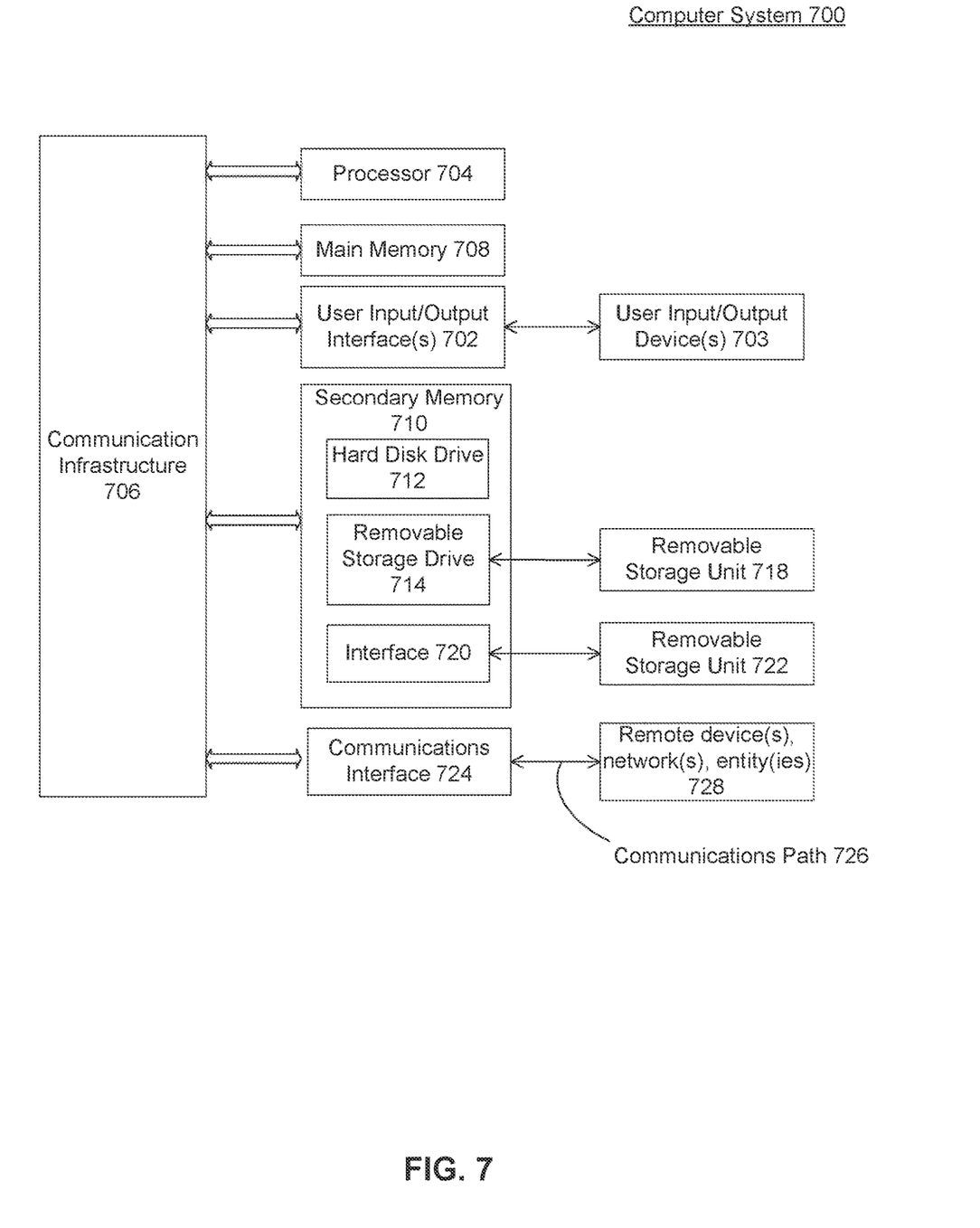
FIG. 7 depicts an example computer system useful for implementing various embodiments.

FIG. 7 depicts an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 1100 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

In some embodiments, a data sending system and/or a data receiving system may communicate using a digital communication network, communication infrastructure 706, etc. for example using a communication device such as communication interface 724. In some examples, the transaction data and/or digital signature may be read from memory, obtained from a remote electronic device (such as a web server, a computerized device, etc.), and so forth. In some examples, these values may be obtained from a blockchain. In some embodiments, the data sending system and/or data receiving system may use communication infrastructure 706 and/or communication interface 724 to communicate with a blockchain manager and/or a blockchain.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system for determining an intersection between two private data sets, the system comprising:
   one or more processors; and
   at least one memory including at least one non-transitory computer-readable medium storing a software application executable by the one or more processors, wherein the software application includes:
   a proxy module configured to receive a first value from a first participant and a second value from a second participant, the first value representing a first record from a first private data set and the second value representing a second record from a second private data set;
   a plurality of delegate modules that together are configured to calculate a first keyed hash value of the first value using a virtual private key and to calculate a second keyed hash value of the second value using the virtual private key, wherein each delegate module has a partial key private to the respective delegate modules and wherein the virtual private key is a combination of the partial keys private to each of the delegate modules, wherein each delegate module is configured (i) to receive, at a respective delegate module of the plurality of delegate modules, a first intermediate value based on the first value and a second intermediate value based on the second value and (ii) to apply, to the first and second intermediate values received, a partial key private to the respective delegate module to determine next first and second intermediate values such that the next first and second intermediate values are used to determine the first and second keyed hash values; and
   a matcher module configured to compare the first and second keyed hash values to determine whether the first and second values match.

2. The system of claim 1, wherein the matcher module is a centralized, non-trusted entity.

3. The system of claim 1, wherein the plurality of delegate modules are configured to generate a zero knowledge proof proving that the first and second keyed hash values were correctly calculated.

4. The system of claim 3, wherein the proxy module is configured to validate the zero-knowledge proof.

5. The system of claim 1, wherein the proxy module is configured to receive a first private data set comprising the first value and a second private data set comprising the second value, wherein the plurality of delegate modules calculate a key hash value for each value in the first and second private data sets, and wherein the matcher module compares the calculated key hash values to determine which values in the first and second private data sets match.

6. The system of claim 1, wherein the first and second values are normalized into a common format.

7. The system of claim 1, wherein the applying (ii) comprises applying a collision resistant hash function.

8. The system of claim 1, wherein the first record has a first identifier and the second record has a second identifier, and wherein the matcher module is configured to, when the first and second values are determined to match, select the first identifier to return to the first participant and the second identifier to return to the second participant.

9. A computer-implemented method for determining an intersection between two private data sets, comprising:
  (a) receiving a first value from a first participant and a second value from a second participant, the first value representing a first record from a first private data set and the second value representing a second record from a second private data set;
  (b) calculating, using a plurality of delegate modules, a first keyed hash value of the first value using a virtual private key and to calculate a second keyed hash value of the second value using the virtual private key, wherein each delegate module has a partial key private to the respective delegate modules of the plurality of delegate modules and wherein the virtual private key is a combination of the partial keys private to each of the plurality of delegate modules, wherein the calculating (b) comprises, repeatedly:
    (i) receiving, at a respective delegate module of the plurality of delegate modules, a first intermediate value based on the first value and a second intermediate value based on the second value,
    (ii) applying, to the first and second intermediate values received, a partial key private to the respective delegate module in (i) to determine next first and second intermediate values such that the next first and second intermediate values are used to determine the first and second keyed hash values; and
  (c) comparing the first and second keyed hash values to determine whether the first and second values match.

10. The method of claim 9, wherein comparing (c) is conducted by a centralized, non-trusted entity.

11. The method of claim 9, further comprising generating a zero knowledge proof proving that the first and second keyed hash values were correctly calculated.

12. The method of claim 11, further comprising validating the zero knowledge proof.

13. The method of claim 9, wherein the receiving (a) comprises receiving the first private data set comprising the first value and the second private data set comprising the second value, wherein the calculating (b) comprises calculating a key hash value for each value in the first and second private data set, and wherein a matcher module compares the calculated key hash values to determine which values in the first and second private data sets match.

14. The method of claim 9, wherein the first and second values are normalized into a common format.

15. The method of claim 9, wherein the applying (ii) comprises applying a collision resistant hash function.

16. The method of claim 9, wherein the first record has a first identifier and the second record has a second identifier, and further comprising, when the first and second values are determined to match:
  returning the first identifier to the first participant; and
  returning the second identifier to return to the second participant.

17. A non-transitory computer-readable device having instructions stored thereon that, when executed by at least one computing device, cause the at least one computing device to perform operations for determining an intersection between two private data sets, the operations comprising:
  (a) receiving a first value from a first participant and a second value from a second participant, the first value representing a first record from a first private data set and the second value representing a second record from a second private data set;
  (b) calculating, using a plurality of delegate modules, a first keyed hash value of the first value using a virtual private key and a second keyed hash value of the second value using the virtual private key, wherein each delegate module has a partial key private to respective delegate modules of the plurality of delegate modules and wherein the virtual private key is a combination of the partial keys private to each of the delegate modules, wherein the calculating (b) comprises, repeatedly:
    (i) receiving, at a respective delegate module of the plurality of delegate modules, a first intermediate value based on the first value and a second intermediate value based on the second value,
    (ii) applying, to the first and second intermediate values received, a partial key private to the respective delegate module in (i) to determine next first and second intermediate values such that the next first and second intermediate values are used to determine the first and second keyed hash values; and
  (c) comparing the first and second keyed hash values to determine whether the first and second values match.

18. The device of claim 17, wherein the comparing (c) is conducted by a centralized, non-trusted entity.

19. The device of claim 17, the operations further comprising generating a zero knowledge proof proving that the first and second keyed hash values were correctly calculated.

20. The device of claim 19, the operations further comprising validating the zero knowledge proof.

21. The device of claim 17, wherein the receiving (a) comprises a first private data set comprising the first value and a second private data set comprising the second value, wherein the calculating (b) comprises calculating a key hash value for each value in the first and second private data set, and wherein a matcher module compares the calculated key hash values to determine which values in the first and second private data sets match.

22. The device of claim 17, wherein the first and second values are normalized into a common format.

23. The device of claim 17, wherein the applying (ii) comprises applying a collision resistant hash function.

* * * * *